UNITED STATES PATENT OFFICE.

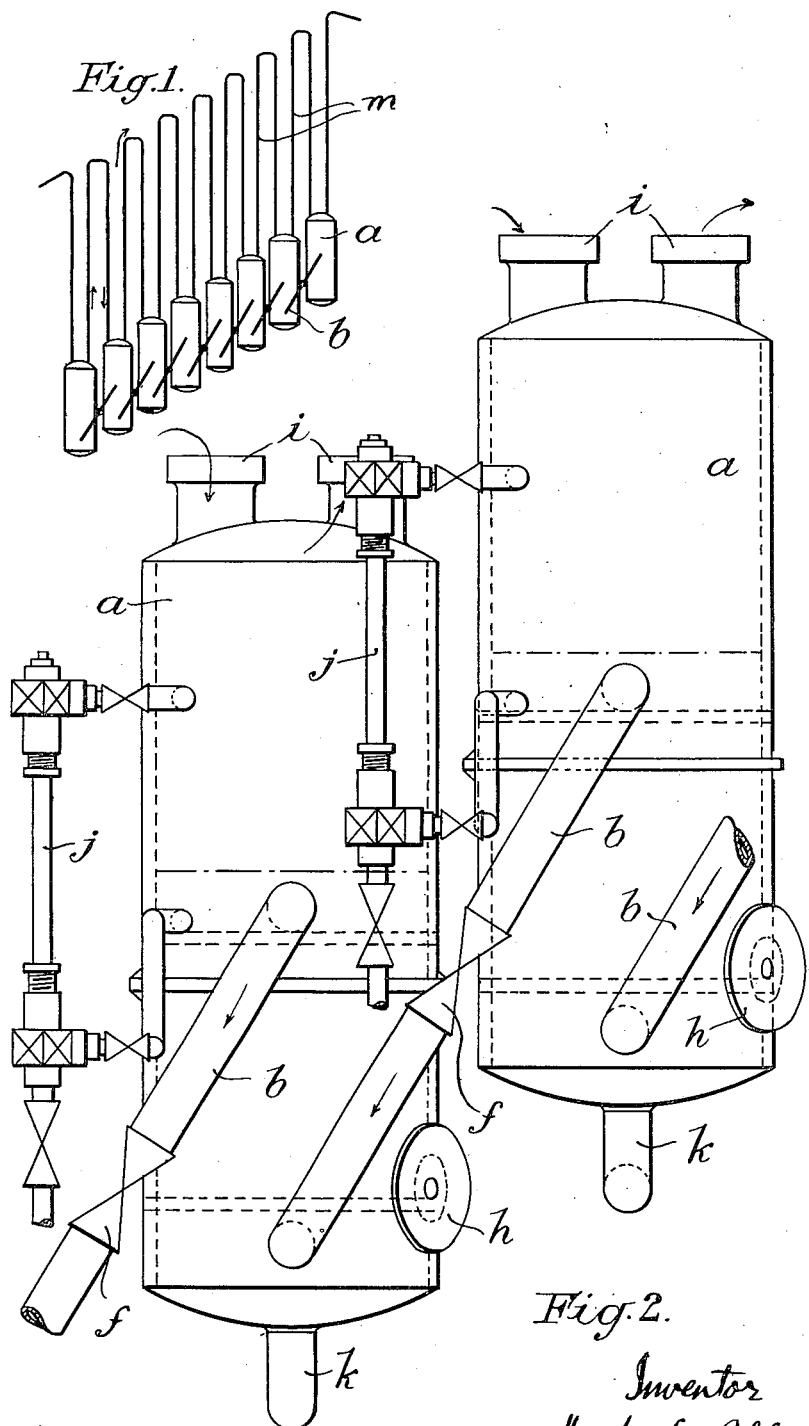

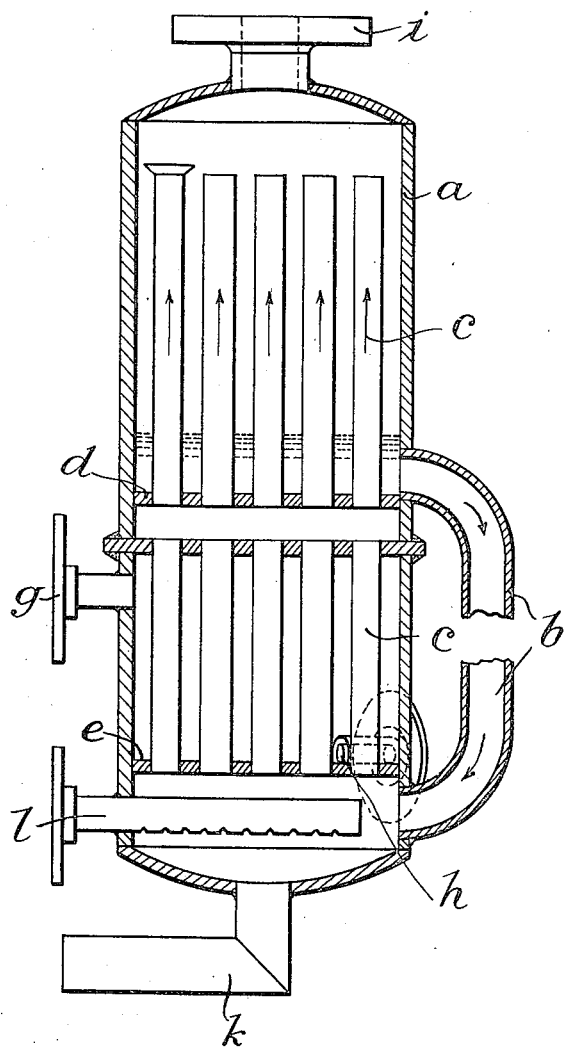

HUGH LOGIE ALLAN, OF AYR, SCOTLAND.

FRACTIONATING APPARATUS.

1,421,886.  Specification of Letters Patent.  Patented July 4, 1922.

Application filed September 15, 1919. Serial No. 324,023.

*To all whom it may concern:*

Be it known that I, HUGH LOGIE ALLAN, a subject of the King of the United Kingdom of Great Britain and Ireland, and resident of 46 Park Circus, Ayr, Scotland, have invented certain new and useful Improvements in Fractionating Apparatus, of which the following is a specification.

This invention relates to fractionating apparatus for the continuous fractional condensation and continuous dephlegmation and total or partial separation of petroleum or other hydrocarbons or mixture of volatile liquids, of the type consisting of a series of heated vessels or rectifiers through which vapours from a liquid vapourizing apparatus are caused to pass.

In accordance with the present invention a series of such vessels are arranged in the form of a cascade so that the liquids condensed and collected in these vessels flow from vessel to vessel and are thereby evaporated partially or wholly by coming in contact with the hotter condensates and vapours.

In the improved apparatus the evaporative effect is increased by fitting the vessels with vertical tubes carried between horizontal tube plates and projecting upwards beyond the upper plate so that the liquid entering the bottom of the vessel ascends the tubes and overflows and passes down the outer walls of the tubes in a film before flowing through a reflux pipe into the next lower vessel.

To further increase evaporation in the vessels additional heat may be applied by passing super-heated steam, hot oil or other suitable heating medium through that portion of the vessel contained between the aforesaid horizontal tube plates.

A further object of the present invention is to use this apparatus (or a portion thereof) as a preheater in the distillation of petroleum or other hydrocarbons and when used for this purpose the liquid to be heated is caused to flow into the vessels at the bottom thereof and to pass upwards through the tubes and to overflow and pass down the walls of the projecting portions of the tubes in the form of a film before passing into the still whilst the vapours or residues from a still (or other heating medium) are passed through the spaces between the tube plates.

In the improved apparatus the cascade system ensures that the condensates in the vessels are re-evaporated by the higher temperature of preceding condensates so that in a series of say eight units the vapours enter the first unit and deposit therein say kerosene, at a temperature of say three hundred and fifty degrees Fah., and at the eighth unit of the same series benzine is deposited, at a temperature of say one hundred and sixty degrees Fah., the benzine from the eighth unit cascading back through say units Nos. 7, 6, 5, 4, 3, 2 to unit No. 1 and being re-evaporated by coming in contact with the hotter condensate in these units.

In order that the invention may be clearly understood the accompanying drawing shows by way of example one form of the apparatus.

Fig. 1 is a diagrammatic view showing the arrangement of an eight-unit apparatus.

Fig. 2 is a side view showing two of the vessels.

Fig. 3 is a vertical section showing the internal construction of one of the vessels.

The atmospheric condenser consists of a series of cast iron, steel or other vessels $a$ of suitable dimensions. In the arrangement shown at Fig. 1 the condenser consists of a battery or group of eight vessels or units $a$ which vessels are connected with each other by means of reflux pipes $b$ and each vessel is fitted internally with a series of vertical tubes $c$ carried in a pair of horizontal tube plates $d, e;$ the tubes being arranged to project upwards beyond the upper tube plate. Each vessel $a$ is subdivided by said horizontal tube plates into upper and lower compartments and an intermediate space; and the communicating reflux pipes are so arranged that the lower parts of the upper compartments communicate with the lower compartments in the vessels immediately below the same. The reflux pipes $b$ are provided with suitable control cocks $f$. For the purpose of giving additional heat to the vessels the space between the tube plates $d, e$ may be supplied with steam or other heating medium through a connection $g$ and for draining said space a drain connection $h$ may be provided.

The vapour pipes (see $m$, Fig. 1.) by means of which the vapours pass from one unit to another are secured to the connections $i$ on the tops of the vessels.

Each vessel $a$ is fitted with a gauge glass device $j$ for indicating the liquid level in the upper compartment and the bottom of the lower chamber in each vessel is provided with a run off pipe connection $k$.

If so desired the lower compartments in each vessel may be provided with an open steam pipe $l$ through which steam can be admitted to the apparatus to further concentrate the contents or fractions in the vessel, and if so desired the pipe $l$ may be utilized for the admission of the liquid to be preheated when the apparatus—or a portion thereof—is used as a pre-heater in the distillation of petroleum or other hydrocarbons.

The operation of the apparatus is as follows: In each of the rectifiers $a$ liquid is continuously rising from the lower compartment through the vertical tubes $c$ and overflowing into the upper compartment from which it finds its way through reflux pipe $b$ into the next lower rectifier of the series. At the same time vapors are continuously passing out of the upper chamber of each rectifier through a connecting condenser pipe to the upper chamber of the next higher rectifier of the series. There is thus a continuous progression of liquid through the series of rectifiers downwardly and a continuous progression of vapors through the series of rectifiers upwardly; but in each unit there is an exchange from liquid to vapor and vice versa, the liquid overflowing the vertical pipes $c$ being augmented by condensates entering the unit through the condenser pipe, and the vapor entering the upper chamber of each unit is augmented by evaporation from the liquid rising in the vertical pipes. It is an important feature of the invention that the upper compartment of each rectifier is heated by the vapors coming through the atmospheric condenser pipes from the next lower rectifier so that the vaporization of the liquid ascending and overflowing the vertical tubes is partially effected by heat given up by said vapors. As previously mentioned, an auxiliary heating effect may be employed if and to whatever extent desirable, by passing steam or other heating medium through the space between the tube plates $d$.

Claims.

1. Fractionating apparatus comprising in combination a plurality of rectifiers having each an upper and a lower compartment with vertical tubes connecting said compartments, condenser pipes connecting the upper compartments in series, and reflux pipes connecting each upper compartment with the lower compartment of the next lower rectifier.

2. Fractionating apparatus according to claim 1 in which the upper and lower compartments are separated by a horizontal partition which supports the vertical tubes.

3. In fractionating apparatus according to claim 1 means for controlling the passage of liquid through the reflux pipes.

4. Fractionating apparatus according to claim 1 in which the vertical tubes project above the bottom of the upper compartment.

5. Fractionating apparatus according to claim 4 in which the reflux pipes lead from the lower part of each upper compartment to the lower compartment of the next lower rectifier.

6. Fractionating apparatus according to claim 1 in which the vertical tubes are carried by a pair of horizontal partitions, with means for passing a heating medium through the space between the partitions.

HUGH LOGIE ALLAN.

Witnesses:
 Hugh McIntosh,
 Harold Hammond.